UNITED STATES PATENT OFFICE.

WILLIAM WARD, OF ZANESVILLE, OHIO.

HORSE-POWER.

Specification of Letters Patent No. 6,713, dated September 11, 1849.

*To all whom it may concern:*

Be it known that I, WILLIAM WARD, of Zanesville, in the county of Muskingum and State of Ohio, have invented a new and useful Improvement in the Horse-Power for Communicating Motion, called "Ward's Counteracting Horse-Power," which is described as follows, reference being had to the annexed drawings of the same, making part of this specification.

The nature of my improvements consists especially in the arrangement and combination of a rotary compound accelerative wheel with its hollow shaft and pinion; by which the power and motion of the master wheel is communicated directly to the pinion of the line shaft, from two points diametrically opposite and independent of each other.

The same letters of reference in the several figures refer to like parts.

Figure 1, represents a plan or top view of the horse power. Fig. 2, is a longitudinal section through the same on the line *o, o* of Fig. 1. Fig. 3, is an elevation of the open end of the compound accelerative wheel and bevel cog wheels secured thereto. Fig. 4, is a longitudinal section on the line *x, x,* of Fig. 1.

The horse or horses to give motion to the driving, or master wheel, are geared to the beams in the usual manner.

A, is the master wheel, or driving wheel, turning on a center gudgeon B in the frame, said frame being made of suitable size and strength, to support the several parts and bearings of the shafts.

C, are holding rollers, whose axles are secured in frames D, and resting upon the master wheel to steady it while in motion and keep it from rising and getting out of gear with the pinions.

E are the cogs of the master or driving wheel which match into a pinion F on a short shaft G and a pinion on a hollow shaft J of the compound accelerating wheel K.

F, is a pinion on the short shaft G for imparting motion to the pinions N of the accelerative wheel by means of a cog wheel H.

G is the horizontal short shaft turning in bearings in the frame.

H is a cogged wheel on the inner end of the short shaft G matching into and turning the pinions N aforesaid in opposite directions.

I is a pinion secured on the hollow shaft of the accelerative wheel K said pinion I matching with the master or driving wheel, and thus give motion to the wheel K and the two pinions N and two beveled cog wheels R which respectively match with the cog wheel H and pinion Q of the line shaft P. This wheel K resembles in form a short hollow cylinder with one of its ends closed and is provided with arms *a, a* in which are placed the bearings of the outer ends of the axles *e* of the pinions.

L is a bar secured between two other arms *a' a'* of the wheel K, to receive the bearings of the beveled cog wheels, or inner ends of the axles *e*, of the pinions.

M is the hub of the cup wheel K through which the line shaft P passes and in which it turns loosely.

N, N, are the aforesaid two pinions on the short axles *e*; these pinions are made to turn with the wheel K, and also by the action of the cogged wheel H, into which they engage, and by which the motion is communicated to the pinion Q of the line shaft through the bevel cog wheels R on the shafts *e*.

R, R, are two bevel cog wheels, secured on and near the inner ends of the axles *e*, and turning respectively with the pinions N in contrary direction and matching in gear with the bevel pinion Q of the line shaft.

P is the line shaft by which the power and motion is communicated to the machinery to be propelled, turning in the hollow shaft J and in the same direction with the wheel K. Q is the beveled pinion on the inner end of the line shaft and matching with the bevel cog wheels R R thus receiving the combined action of the accelerative wheel K, and cogged wheel H.

This arrangement and combination of the rotary compound accelerative wheel K (by which the power of the master or driving wheel is directly applied to the pinion of the line shaft, and thence to the machinery to be propelled, from the two points, diametrically opposite, and turning independent of and in contrary direction to each other) is found to produce and continue a speed and power sufficient to propel the machinery desired and also to relieve the center gudgeon

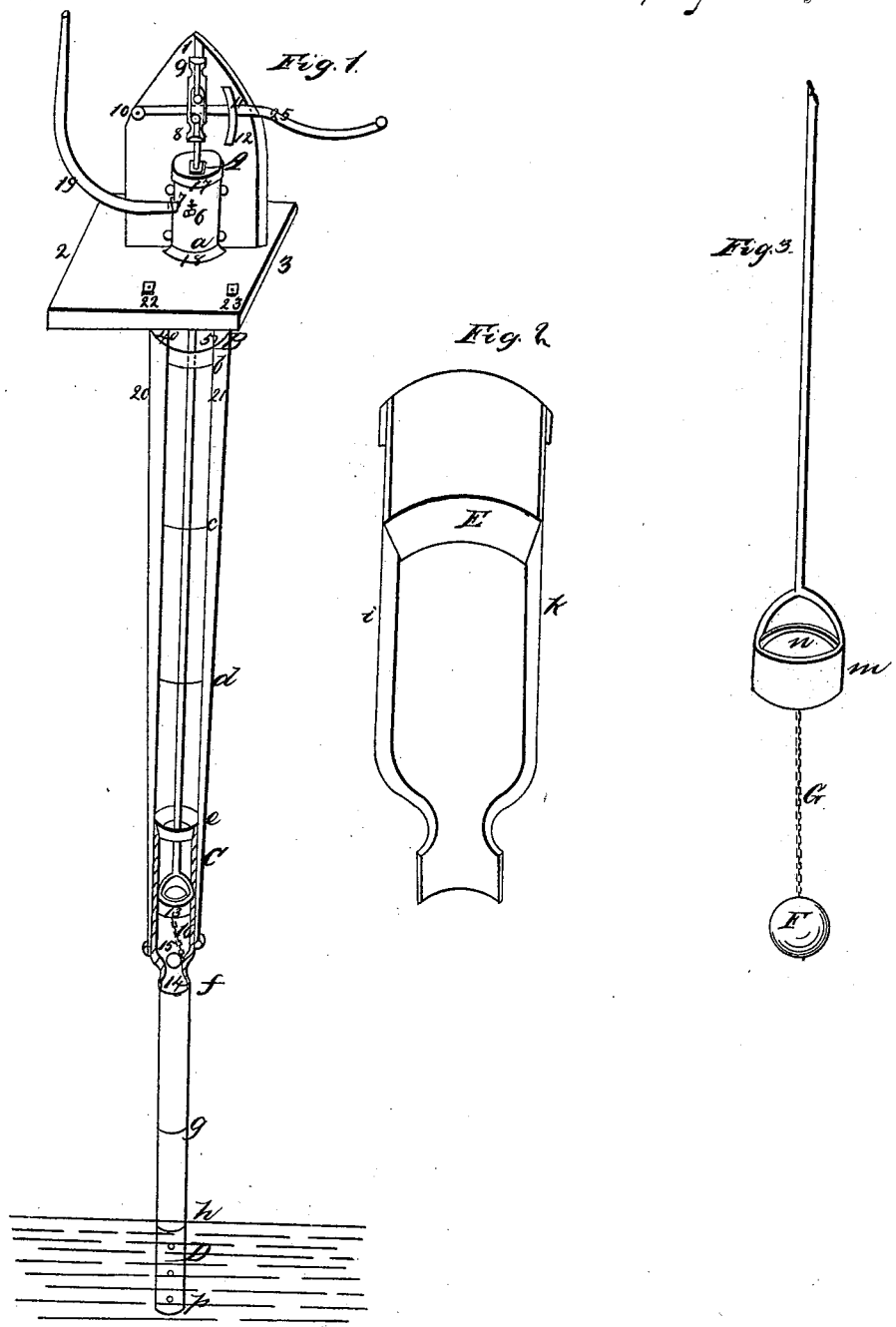
J. B. Read,
Force Pump.
No. 6,714.  Patented Sept. 11, 1849.